Figure 1:
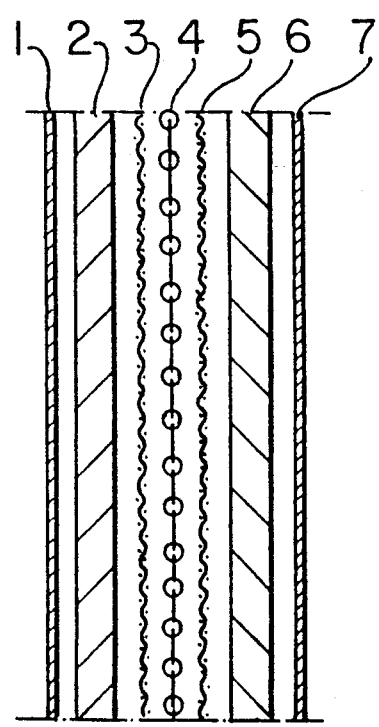

United States Patent [19]

Scheerder et al.

[11] Patent Number: 5,071,698
[45] Date of Patent: Dec. 10, 1991

[54] HOCKEY PADDING

[76] Inventors: Arnold H. E. M. Scheerder, R.R.#1, Limoges, Ontario, Canada, K0A 2M0; Joseph L. R. Blais, 142 Gardner Street, Cornwall, Ontario, Canada, K6H 5H4

[21] Appl. No.: 552,239

[22] Filed: Jul. 12, 1990

Related U.S. Application Data

[63] Continuation-in-part of Ser. No. 353,866, May 18, 1989, abandoned.

[51] Int. Cl.⁵ .............................................. D03D 13/00
[52] U.S. Cl. .................................... 428/256; 428/246; 428/247; 428/248; 428/285; 428/286; 428/221; 428/222; 428/102; 428/193; 428/911
[58] Field of Search ............... 428/256, 246, 911, 247, 428/248, 285, 286, 221, 222, 102, 193; 128/888

[56] References Cited

U.S. PATENT DOCUMENTS

| | | | |
|---|---|---|---|
| 1,163,094 | 12/1915 | Kurek | 428/911 |
| 1,758,296 | 5/1930 | Schaumann | 428/256 |
| 2,617,207 | 8/1950 | Jennett | 36/2 R |
| 2,816,578 | 6/1953 | Frieder et al. | 139/409 |
| 2,864,091 | 6/1957 | Schneider | 2/161 R |
| 3,813,281 | 5/1974 | Burgess et al. | 428/51 |
| 4,493,865 | 1/1985 | Kuhlmann et al. | 428/256 |
| 4,507,353 | 3/1985 | Kuhlmann et al. | 428/246 |

FOREIGN PATENT DOCUMENTS 2945884 5/1981 Fed. Rep. of Germany ...... 428/222
0001333 of 1900 United Kingdom.

OTHER PUBLICATIONS

Taylor, V, "Jawbreaker for Sharks", National Geographic, May 1981, pp. 664-667.

Primary Examiner—William J. Van Balen
Assistant Examiner—Beverly A. Pawlikowski
Attorney, Agent, or Firm—Ross, Howison, Clapp & Korn

[57] ABSTRACT

An improved multilayer flexible body system, adapted for use in protective sports equipment, is described which comprises in combination in sequence an inner cover layer; a first flexible padding layer; a first elastomer containing woven fabric layer; a woven metal mesh layer; a second elastomer containing woven fabric layer; a second flexible padding layer; and an outer cover layer, each of which are securely bonded together at their periphery. The construction method also ensures that the woven metal mesh layer is free to move between the adjacent fabric layers.

11 Claims, 1 Drawing Sheet

HOCKEY PADDING

RELATED APPLICATION

This application is a continuation-in-part of Ser. No. 07/353,866, filed May 18, 1989.

This invention seeks to provide an improved form of flexible protective padding of use in various sports, and of particular relevance to ice hockey.

In many sports it is commonplace for a player to be provided with protective equipment which is intended to protect the player from the consequences of impact with both fixed hard structures, such as goal posts, and ice rink boards, and with moving items, such as other players, their equipment, and small hard items such as hockey puck. For some areas of the players body which require protection rigid, tough plastics materials provided with interior resilient padding are used. These structures are eminently effective. For other areas protection is needed which cannot be rigid. The protection has to be flexible in order to permit body movement, for example at the knee, neck, elbow, and wrist. Furthermore, for an ice hockey player, in addition to the hazards of collision with other players, with the boards which surround a rink, with hockey sticks, and with the puck, there is the additional and different problem posed by accidental impact with a skate blade. This adds a quite sharp cutting edge to what is otherwise an impact problem.

Various schemes have been proposed for protecting parts of the body both from impact damage, and from damage by a cutting edge, with an essentially flexible protective system.

Starting in medieval times, chain mail in one form or another has been used to protect a wearer from the effects of sharp edged weapons and from projectiles. Thus a relatively simple chain mail system has been used recently to protect the wearer against shark attack (National Geographic, Vol. 159, No. 5, page 664 (May, 1981)). Similarly, Hansom in U.K. Patent No. 1,333 of 1900 describes a form of protection against rifle bullets, etc., which consists of a woven metal matting comprising adjacent interlaced cylindrical coils. In neither of these disclosures is there any consideration of mitigating simultaneously both the effects of the cutting edge, and any effects which its velocity might have. Hansom appears to use his metal weave without any backing at all.

Various systems including a backing having been described. Thus Kurek, in U.S. Pat. No. 1,163,094 describes a system in which a variety of chain mail is combined with a layer of leather, to which may be attached a thin layer of "raw cotton", or even also a metal backing sheet or shield. Such a system is essentially inflexible. Schneider in U.S. Pat. No. 2,864,091 and Jennett in U.S. Pat. No. 2,617,207 both consider the problem of protecting particular parts of the body from a cutting edge. Schneider proposes a glove front piece wherein a light weight wire mesh is embedded in a rubbery elastomer. Jennett proposes a heel tendon (Achilles tendon) protector for an ice skate boot which comprises two layers of leather with a metal mesh, preferably of phosphor bronze, therebetween. A thin rubber sponge pad may be provided between the inner leather layer and the boot, to protect the ankle bones: these are not protected by the metal mesh. In a similar way, Burgess et al in U.S. Pat. No. 3,813,281 propose a composite flexible armour comprising a multi-layer laminate. Each layer of the laminate includes both a deformable plastic foam layer and two layers of overlapping thin metal discs. The laminate functions at least in part to absorb impact forces by forcing gas out of the foam cells. It would therefore seem that such a system would have to be replaced after receiving a substantial impact, which is somewhat impractical for a sports player.

Other protective systems have been proposed, which do not incorporate chain mail or its equivalent. However, it appears that in these systems, such as that described by Frieder et al in U.S. Pat. No. 2,816,578, permanent deformation, or even limited damage, to the system is allowed to happen as a means whereby the impact energy is dissipated.

To be of use to a sports player, especially an ice hockey player, a flexible protective system should ideally have certain properties. These are flexibility without hindering movement, an ability to mitigate impacts from both small and large hard objects, an ability to resist a thin, hard, and possibly sharp, edge, and an ability to "breathe", thus making the equipment comfortable to the wearer or user. None of the known systems adequately display all of these desirable properties. This invention seeks to provide an improved protective system which comes nearer to providing these properties than the proposed or currently available systems.

Thus this invention provides a multi-layer flexible body protective system comprising in combination in sequence:

an inner cover layer;
a first flexible padding layer;
a first padding layer;
a first elastomer containing woven fabric layer;
a woven metal mesh layer;
a second elastomer containing woven fabric layer;
a second flexible padding layer; and
an outer cover layer,
wherein all of the layers are securely bonded together at their periphery, and wherein the woven metal mesh layer is free to move between the first and the second elastomer containing fabric layers adjacent to it.

Preferably the inner cover layer is a woven cotton or flannel fabric, and the outer cover layer is a plastic impregnated or coated water resistant woven fabric.

Preferably both of the padding layers are cotton wool, or other flexible synthetic fiber wool; in a more preferred embodiment each of the padding layers are of substantially the same thickness.

Preferably the elastomer impregnated woven fabric layer comprises the form of fabric commonly used in so-called elastic bandages.

Preferably the metal mesh layer is a lightweight metal mesh composed of interlaced rings.

The invention will now be described in more detail with reference to FIG. 1, which shows a cross-section through a typical protective pad fabricated according to this invention. This figure also indicates the difference between the protective system of this invention and those commonly in use.

Referring to FIG. 1, the commonly used protection, for example for a knee or elbow pad for a hockey player currently marketed by makers such as Cooper and C.C.M. comprises an inner woven fabric layer 1, a padding layer 2 (which may be split into two parts thus providing layers 2 and 6) and an outer cover layer 7. These layers are generally joined together at the edge, usually by way of strip of the same fabric as the cover layer 7 folded over the edge followed by at least one line of stitching through all of the layers. For a larger pad, further lines of stitching can be provided both to hold the layers together and to provide lines along which the pad will fold and flex as the wearer moves. Thus a large pad can have a somewhat quilted appearance.

In these pads as commonly made (e.g. by Cooper and C.C.M.) the inner layer is usually a cotton or synthetic fiber flannel fabric. The padding layer is "cotton wool", which is a randomly-oriented batt which may be made from cotton or other suitable synthetic fibers such as polyester. The outer layer is generally water resistant, and comprises a polyester, or nylon, fabric which has been impregnated with a plastic, commonly P.V.C.

The body protection system of this invention utilizes essentially the same methods and materials of construction, but incorporates three further layers. The inner fabric 1 and the inner padding layer 2 are the same, and further the inner and outer padding layers 2 and 6, which each contain substantially the same amount of material, taken together represent essentially the same amount of padding as is currently commonly used. This is desirable in order that a knee pad, for example, when made according to this invention is overall no bulkier or stiffer than the pads currently commonly used. The same sort of fabric is also used for the outer cover 7. Three further layers are added, compared to known pads, between the two padding layers 2 and 6. These are a first elastomer containing woven fabric layer 3, a second elastomer containing woven fabric layer 5, and a woven metal mesh layer 4 in between them. All of these layers are held together by a stitched-on edge strip as is standard practice.

As assembled when the protective system is made, none of these three additional layers, that is the two elastomer fabric layers and the metal mesh, are placed under any deliberate level of tension, beyond any small stresses imposed in assembling the particular piece. All that is necessary is that they be assembled essentially flat and securely attached to the other layers at the periphery of the particular piece. For example, for a small pad such as an elbow pad, this will mean that each of layers 1 through 7 will be cut to essentially the same size using the same pattern.

For a small pad, such as an elbow or knee pad, the retention thus provided for the three inner layers 3, 4 and 5 appears to be sufficient, and will ensure that the metal mesh layer 4 is free to move and flex between the fabric layers 3 and 5. For a larger pad, it is desirable to tack together the woven metal mesh layer and at least one of the fabric layers 3 or 5. Preferably, all three layers 3, 4 and 5 are tacked together. This will facilitate assembly of the pad as it will help prevent the metal mesh from sagging and drooping. However, the amount of tacking used should be both kept to a minimum, and kept well spaced apart, to ensure that the metal mesh layer retains an adequate level of freedom of movement between the fabric layers.

There is considerable choice in the elastomer containing woven fabric. What is required is a fabric which can stretch, and then return essentially to its original dimensions and shape. We have found that the form of fabric used in the commercially available elastic bandages is eminently suitable.

Similarly, there is considerable choice as to the metal mesh. For flexibility reasons, one made up from mutually interlaced rings, preferably using welded, or otherwise jointed, such as soldered, rings to provide an essentially continuous ring appears to be suitable. The size of ring and weight of wire to be used need to be balanced against obtaining adequate protection without overly increasing weight. For a knee or elbow pad we have found that a ring size of about 3 to 4 mm using a wire of about 0.7 mm is suitable. The metal used for the wire can be any of several; copper appears to be too soft, although both brass and bronze are satisfactory. As there is some risk of corrosion (due to water and sweat penetrating the pad) we prefer to use stainless steel.

Over time it is also observed that the elastomer fabric looses its elasticity. The rate at which this happens is determined by the amount of use. We have found that a knee pad in use regularly by a hockey player lasts for at least one full season.

It is not at all clear why this form of construction should be as effective as it has been found to be. Clearly the metal mesh layer can be expected to provide adequate protection from injury by a sharp edge, such as a skate blade. However, this system also mitigates potentially bruising impacts from both a skate blade and other items, especially a hockey stick and a puck, provided that the metal mesh layer is relatively free to move between the two elastomer-containing fabric layers.

What we claim as our invention is:

1. A light weight multilayer flexible body protective system comprising in combination in sequence:
   an inner cover layer;
   a first flexible padding layer;
   a first stretchable elastomer containing woven fabric layer;
   a lightweight woven metal mesh layer;
   a second stretchable elastomer containing woven fabric layer;
   a second flexible padding layer; and
   an outer cover layer;
   wherein
   (i) all of the layers are securely bonded together at their periphery; and
   (ii) the light weight woven metal mesh layer is free to move between the first and the second stretchable elastomer containing fabric layers adjacent to it.

2. A system according to claim 1 wherein the inner cover layer is a cotton or flannel fabric.

3. A system according to claim 1 wherein the outer cover layer is plastic impregnated or coated water resistant woven fabric.

4. A system according to claim 1 wherein each of the padding layers is cotton wool in which the fibers are of cotton, a synthetic material, or a mixture thereof.

5. A system according to claim 1 wherein each of the padding layers are of substantially the same thickness.

6. A system according to claim 1 wherein each of the fabric layers comprise elastic bandage fabric.

7. A system according to claim 1 wherein the metal mesh layer is a lightweight metal mesh composed of individual interlaced rings.

8. A system according to claim 7 wherein the individual rings are continuous rings.

9. A system according to claim 8 wherein the individual rings are welded stainless steel rings having a diameter of from about 3 to about 4 mm made from wire having a diameter of about 0.7 mm.

10. A system according to claim 1 wherein at least one fabric layer and the metal mesh layer adjacent thereto are tacked together at a plurality of spaced apart locations.

11. A system according to claim 10 wherein both fabric layers and the metal mesh layer therebetween are tacked together at a plurality of spaced apart location.

* * * * *